United States Patent
Saito et al.

(10) Patent No.: US 11,414,571 B2
(45) Date of Patent: Aug. 16, 2022

(54) DECORATIVE FILM

(71) Applicant: AGC Inc., Chiyoda-ku (JP)

(72) Inventors: Shun Saito, Chiyoda-ku (JP); Takashi Morizumi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 141 days.

(21) Appl. No.: 16/689,195

(22) Filed: Nov. 20, 2019

(65) Prior Publication Data
US 2020/0086613 A1    Mar. 19, 2020

Related U.S. Application Data (63) Continuation of application No. PCT/JP2018/019882, filed on May 23, 2018.

(30) Foreign Application Priority Data

May 26, 2017 (JP) .............................. JP2017-104752
Apr. 5, 2018 (JP) .............................. JP2018-072895

(51) Int. Cl.
*C09J 7/29* (2018.01)
*C09D 127/12* (2006.01)
(Continued)

(52) U.S. Cl.
CPC ................ *C09J 7/29* (2018.01); *C08K 5/005* (2013.01); *C08K 5/0016* (2013.01);
(Continued)

(58) Field of Classification Search
None
See application file for complete search history.

(56) References Cited

U.S. PATENT DOCUMENTS 7,702,256 B2 *  4/2010  Nukada .............. G03G 15/5008
                                             399/159
2004/0121160 A1 *  6/2004  Neppl ................ C08G 18/6254
                                             427/407.1
(Continued)

FOREIGN PATENT DOCUMENTS

CN        106243856 A    12/2016
EP        2 113 379 A1   11/2009
(Continued)

OTHER PUBLICATIONS

Machine translation of JP 10183027 A (Year: 1998).*
International Search Report dated Aug. 21, 2018 in PCT/JP2018/019882 filed on May 23, 2018.

*Primary Examiner* — Frank D Ducheneaux
(74) *Attorney, Agent, or Firm* — Element IP, PLC

(57) ABSTRACT

The object of the present invention is to provide a decorative film excellent in moldability and tensile strength; and a method for producing a three-dimensionally molded article with a decorative film. The decorative film of the present invention is used for decorating a three-dimensionally molded article. It is a decorative film comprising at least a substrate film layer and a clear layer, wherein the clear layer is made of a fluorinated polymer comprising units based on a fluoroolefin, units based on a monomer having no crosslinkable group, which is at least one member selected from the group consisting of a vinyl ether, a vinyl ester, an allyl ether, an allyl ester and a (meth)acrylic acid ester, and units having a crosslinkable group; and the content of the units based on a fluoroolefin is from 20 to 70 mol % to all units which the fluorinated polymer comprises.

17 Claims, 1 Drawing Sheet

(51) Int. Cl.
*C08L 27/12* (2006.01)
*C08K 5/00* (2006.01)
B29C 45/14 (2006.01)

(52) U.S. Cl.
CPC ............ *C08K 5/0025* (2013.01); *C08L 27/12* (2013.01); *C09D 127/12* (2013.01); *B29C 2045/14155* (2013.01); *C09J 2203/354* (2020.08); *C09J 2301/30* (2020.08); *C09J 2427/00* (2013.01); *C09J 2433/006* (2013.01)

(56) References Cited

U.S. PATENT DOCUMENTS

| | | | |
|---|---|---|---|
| 2014/0088248 A1* | 3/2014 | Kasahara | C08F 214/186 524/768 |
| 2014/0212673 A1* | 7/2014 | Saito | C08G 18/6705 522/111 |
| 2016/0208051 A1* | 7/2016 | Ishiazaki | C08K 5/42 |

FOREIGN PATENT DOCUMENTS

| | | |
|---|---|---|
| JP | 10-183027 A | 7/1998 |
| JP | 2014-184726 A | 10/2014 |

\* cited by examiner

DECORATIVE FILM

CROSS REFERENCE TO RELATED APPLICATIONS

This application is a continuation of PCT Application No. PCT/JP2018/019882 filed on May 23, 2018, which is based upon and claims the benefit of priority from Japanese Patent Application No. 2017-104752 filed on May 26, 2017 and Japanese Patent Application No. 2018-072895 filed on Apr. 5, 2018. The contents of those applications are incorporated herein by reference in their entireties.

TECHNICAL FIELD

The present invention relates to a decorative film for decorating a three-dimensionally molded article.

BACKGROUND ART

On the surface of a three-dimensionally molded article to be used in the field of interior/exterior products for automobiles, decoration may sometimes be applied by a decorative film, for the purpose of imparting a design property or protection of the surface. In Patent Document 1, a decorative film having a clear layer containing a polyvinylidene fluoride is disclosed.

PRIOR ART DOCUMENT

Patent Document

Patent Document 1: JP-A-2014-184726

DISCLOSURE OF INVENTION

Technical Problems

However, the decorative film having a clear layer containing a polyvinylidene fluoride, as disclosed in Patent Document 1, was poor in followability of the clear layer to the three-dimensionally molded article, and was sometimes inferior in moldability. Further, the clear layer containing a polyvinylidene fluoride was sometimes inferior in tensile strength.

In view of the above problems, the present invention has an object to provide a decorative film excellent in moldability and tensile strength, and a method for producing a three-dimensionally molded article with a decorative film.

Solution to Problems

The present inventor has intensively studied the above problems and, as a result, has found it possible to obtain desired effects if the clear layer is formed by using a fluorinated polymer comprising units based on a fluoroolefin in a specific amount, units based on a monomer having no crosslinkable group, which is at least one member selected from a vinyl ether, a vinyl ester, an allyl ether, an allyl ester and a (meth)acrylic acid ester, and units having a crosslinkable group, and thus has arrived at the present invention.

That is, the present inventor has found it possible to solve the above problems by the following constructions.

[1] A decorative film for decorating a three-dimensionally molded article, comprising at least a substrate film layer and a clear layer, wherein the clear layer is made of a fluorinated polymer comprising units based on a fluoroolefin, units based on a monomer having no cross-linkable group, which is at least one member selected from the group consisting of a vinyl ether, a vinyl ester, an allyl ether, an allyl ester and a (meth)acrylic acid ester, and units having a crosslinkable group, and the content of said units based on a fluoroolefin is from 20 to 70 mol % to all units which said fluorinated polymer comprises.

[2] The decorative film according to [1], wherein the content of said units having a crosslinkable group is from 3 to 40 mol % to all units which said fluorinated polymer comprises.

[3] The decorative film according to [1] or [2], wherein said units based on a monomer having no crosslinkable group have a $C_{4-8}$ alkyl group represented by the formula —$C(Y^{10})_3$ (wherein $Y^{10}$ are each independently a $C_{1-5}$ alkyl group) or a $C_{6-10}$ cycloalkyl group.

[4] The decorative film according to any one of [1] to [3], wherein the glass transition temperature of the fluorinated polymer is from 30 to 120° C.

[5] The decorative film according to any one of [1] to [4], wherein the hydroxy value of the fluorinated polymer is from 30 to 150 mgKOH/g.

[6] The decorative film according to any one of [1] to [5], wherein the clear layer contains a plasticizer.

[7] The decorative film according to [6], wherein the plasticizer is a plasticizer made of a (meth)acrylic resin having a weight average molecular weight of from 1,000 to 20,000.

[8] The decorative film according to [6], wherein the plasticizer is a plasticizer made of a polyether glycol having a weight average molecular weight of from 100 to 10,000.

[9] The decorative film according to any one of [1] to [8], wherein the clear layer contains a compound having two or more isocyanate groups in one molecule.

[10] The decorative film according to any one of [1] to [9], wherein the clear layer contains at least one member selected from the group consisting of an organic ultraviolet absorber and an organic light stabilizer.

[11] The decorative film according to any one of [1] to [10], wherein the three-dimensionally molded article is an automobile exterior member or an automobile interior member.

[12] The decorative film according to any one of [1] to [11], wherein the decorative film further has a bonding layer, and the bonding layer, the clear layer and the substrate film layer are sequentially laminated in this order so that the clear layer and the substrate film layer are laminated in contact with each other.

[13] The decorative film according to any one of [1] to [11], wherein the decorative film further has a bonding layer, and the bonding layer, the substrate film layer and the clear layer are sequentially laminated in this order.

[14] A method for producing a three-dimensionally molded article with a decorative film, which comprises press-bonding the bonding layer of the decorative film as defined in [12] and the surface to be decorated of a three-dimensionally molded article in a reduced pressure atmosphere by a vacuum molding method, and then peeling off the substrate film layer, to obtain the three-dimensionally molded article with the decorative film, having the clear layer on the outermost surface.

[15] A method for producing a three-dimensionally molded article with a decorative film, which comprises press-bonding the bonding layer of the decorative film as defined in [13] and the surface to be decorated of a three-dimensionally molded article in a reduced pressure atmosphere by a vacuum molding method, to obtain the three-dimensionally molded article with the decorative film, having the clear layer on the outermost surface.

Advantageous Effects of Invention

According to the present invention, it is possible to provide a decorative film excellent in moldability and tensile strength, and a method for producing a three-dimensionally molded article with a decorative film.

DESCRIPTION OF EMBODIMENTS

Meanings of terms in the present invention are as follows.

A "(meth)acrylate" is a generic term for an "acrylate" and a "methacrylate", and a "(meth)acrylic" is a generic term for "acrylic" and "methacrylic".

A "unit" is a generic term for an atomic group formed directly by polymerization of a monomer and derived from one molecule of the monomer, and an atomic group obtainable by chemically converting a portion of such an atomic group. The contents (mol %) of the respective units to all units which the polymer comprises, are obtainable by analyzing the polymer by the nuclear magnetic resonance spectroscopy method, and they can be estimated also from the charged amounts of the respective monomers in the preparation of the polymer.

An "acid value" and a "hydroxy value" are, respectively, values measured in accordance with the methods of JIS K0070-3 (1992).

A "glass transition temperature" is an intermediate point glass transition temperature of a polymer, which is measured by a differential scanning calorimetry (DSC) method. The "glass transition temperature" is referred to also as "Tg".

A "softening temperature" is a value which is measured in accordance with the method of JIS K7196 (1991).

A "number average molecular weight" and a "weight average molecular weight" are values which are measured by gel permeation chromatography using polystyrene as a standard substance. The "number-average molecular weight" is referred to also as "Mn", and the "weight average molecular weight" is referred to also as "Mw".

A "total light transmittance" is a value which is measured by the D light source in accordance with JIS K7361-1: 1997. An "ultraviolet transmittance" is a value of the light transmittance at a wavelength of from 10 to 400 nm among the total light transmittance.

In the present invention, a decorative film means a film to be used for the purpose of imparting a design property or protection of the surface, for an article such as a molded article.

The decorative film of the present invention is a decorative film for decorating a three-dimensionally molded article, comprising at least a substrate film layer and a clear layer, wherein said clear layer is made by using a fluorinated polymer comprising units (hereinafter referred to also as "units F") based on a fluoroolefin, units (hereinafter referred to also as "units 1") based on a monomer (hereinafter referred to also as "monomer 1") having no crosslinkable group, which is at least one member selected from the group consisting of a vinyl ether, a vinyl ester, an allyl ether, an allyl ester and a (meth)acrylic acid ester, and units (hereinafter referred to also as "units 2") having a crosslinkable group, wherein the content of said units based on a fluoroolefin is from 20 to 70 mol %, to all units which said fluorinated polymer comprises.

The decorative film of the present invention is excellent in moldability and tensile strength. Since the fluorinated polymer in the present invention contains units 1, the clear layer in the present invention is rich in flexibility, as compared with the clear layer formed by using a polyvinylidene fluoride as a fluorinated polymer. Therefore, it is considered that the decorative film of the present invention is excellent in moldability, as it follows well to a three-dimensionally molded article which may have a complex three-dimensional shape.

Further, it is considered that since the fluorinated polymer in the present invention contains units 2, the clear layer becomes strong, whereby it was possible to obtain a decorative film excellent in tensile strength.

Further, since the clear layer of the present invention contains the fluorinated polymer as described above, the decorative film of the present invention is excellent also in antifouling properties and durability/weather resistance.

First, the construction of the decorative film of the present invention will be described with reference to the drawings.

Figure 1:
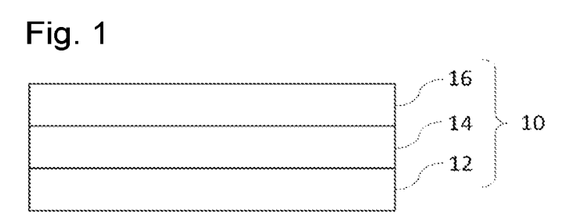
FIG. 1 is a schematic side view showing an example of a laminated structure of the decorative film of the present invention.

FIG. 1 is a schematic side view showing a laminated structure of a decorative film 10 as an embodiment of the present invention. The decorative film 10 comprises a bonding layer 12, a clear layer 14 and a substrate film layer 16, and the respective layers are laminated in this order.

Further, in the example in FIG. 1, the clear layer 14 and the substrate film layer 16 are arranged in contact with each other. However, in a case where a releasing layer to be described later is provided between the clear layer 14 and the substrate film layer 16, the clear layer 14 and the substrate film layer 16 may not be in contact with each other.

By press-bonding (press heat fusing, press heat crosslinking, etc.) the bonding layer 12 of the decorative film 10 and the surface to be decorated, of a three-dimensionally molded article (as described later) in a reduced pressure atmosphere and then peeling off the substrate film layer 16 from the decorative film 10, it is possible to obtain the three-dimensionally molded article with the decorative film, having the clear layer 14, the bonding layer 12 and the three-dimensionally molded article disposed in this order. Thus, the clear layer 14 is located at the outermost surface of the three-dimensionally molded article with the decorative film.

Although this Fig. shows an embodiment of the decorative film having a bonding layer, the decorative film of the present invention may not have a bonding layer. In the case where the decorative film of the present invention does not have a bonding layer, a layer other than the clear layer (e.g. the substrate film layer, or if having a design layer, the design layer), may be heat-press bonded to the surface to be decorated, of a three-dimensionally molded article to be described later, to obtain the three-dimensionally molded article with the decorative film.

The clear layer 14 is excellent also in releasability from the substrate film layer 16, because it contains a fluorinated polymer as described later.

Figure 2:
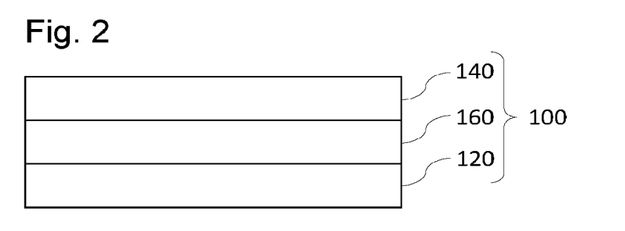
FIG. 2 is a schematic side view showing another example of a laminated structure of the decorative film of the present invention.

FIG. 2 is a schematic side view showing a laminated structure of a decorative film 100 as another embodiment of the present invention. The decorative film 100 comprises a bonding layer 120, a substrate film layer 160 and a clear layer 140, and the respective layers are laminated in this order.

By press bonding (press heat fusing, press heat crosslinking, etc.) the bonding layer 120 of the decorative film 100 and the surface to be decorated, of a three-dimensionally molded article (to be described later) in a reduced pressure atmosphere, it is possible to obtain the three dimensionally molded article with the decorative film, having the clear layer 140, the substrate film layer 160, the bonding layer 120 and the three-dimensionally molded article disposed in this order. Thus, the clear layer 140 is located at the outermost surface of the three-dimensionally molded article with the decorative film.

The decorative film of the present invention may have at least a substrate film layer and a clear layer, and may have an optional layer between the respective layers.

Further, for adhesion to a three-dimensionally molded article to be described later, it may have a bonding layer on the surface opposite to the clear layer.

Further, although not shown in FIGS. 1 and 2, in order to improve the design property, etc. of the decorative film, the decorative film may have a design layer. The design layer is preferably disposed between the bonding layer and the clear layer. In a case where the decorative film of the present invention has a bonding layer, the design layer is more preferably disposed to be in contact with the bonding layer.

Specifically, in a case where the decorative film 10 in FIG. 1 has a design layer, it is preferred that the bonding layer 12, the design layer, the clear layer 14 and the substrate film layer 16 are sequentially laminated in this order.

Further, in a case where the decorative film 100 in FIG. 2 has a design layer, it is preferred that the bonding layer 120, the design layer, the substrate film layer 160 and the clear layer 140 are sequentially laminated in this order.

Otherwise, the bonding layer or clear layer may also be used as a design layer, and in such a case, a design layer may not be provided.

The bonding layer in the present invention is a layer for bonding the bonding layer surface of the decorative film and the surface of the three-dimensionally molded article. The bonding layer may also have a function as a design layer which will be described later. In such a case, if a coloring agent or the like is incorporated in the bonding layer, it is possible to obtain a bonding layer having also a function as a design layer.

The bonding layer is preferably made from either a bondable resin, or a composition containing a bondable resin. As the bondable resin, an adhesive resin, a fusible resin, a sticky resin, etc. are preferred. The bonding layer may be formed by using, for example, a bonding layer forming agent containing a bondable resin, or a bonding layer forming agent containing a component which becomes a bondable resin when reacted. Otherwise, it can be formed by using a film made of a bondable resin or made of a composition containing a bondable resin.

As the bondable resin, a heat-fusible resin or a heat crosslinkable resin is preferred. In the case of a heat-fusible resin, by cooling and solidifying a heat softened resin in a state in contact with the surface of a three-dimensionally molded article, it can be bonded to the surface. In the case of a heat crosslinkable resin, by letting the resin be heat-crosslinked in a state in contact with the surface of a three-dimensionally molded article, it can be bonded to the surface.

As the heat-fusible resin, a partially crosslinked heat-fusible resin or thermoplastic resin having a low softening temperature may be mentioned. The bonding layer containing a heat-fusible resin can be formed by using a bonding layer forming agent containing a heat-fusible resin, or a bonding layer-forming agent containing a component which becomes a heat-fusible resin when reacted. For example, by using a bonding layer forming agent containing a polyol and a polyisocyanate, it is possible to form a bonding layer containing a heat-fusible polyurethane resin.

The softening temperature of the heat-fusible resin is preferably from 20 to 100° C., more preferably from 25 to 90° C., from the viewpoint of blocking resistance and moldability of the decorative film.

Mw of the heat-fusible resin is preferably from 5,000 to 150,000, particularly preferably from 6,000 to 130,000, from the viewpoint of film formability and bondability.

From the viewpoint of excellent adhesion to a three-dimensionally molded article, the heat-fusible resin is preferably at least one type of heat-fusible resin selected from the group consisting of a heat-fusible urethane resin, an acrylic resin, an olefin resin, a vinyl chloride-vinyl acetate resin and a butyral resin.

The bondable resin may be a heat crosslinkable resin comprising a resin as the main agent and a curing agent. For example, a heat crosslinkable resin, such as a heat crosslinkable urethane resin comprising a solid polyol or solid hydroxy terminated polyurethane prepolymer and a solid polyisocyanate or solid blocked polyisocyanate, or an epoxy resin comprising a solid polyepoxide and a solid epoxy resin curing agent, may be mentioned.

The bonding layer forming agent may be one containing the above-mentioned heat crosslinkable resin, or may be one containing a reactive component which becomes a cross-linkable resin.

The bonding layer and the bonding layer forming agent may contain components other than those described above. Specific examples of components other than those described above, may be an organic ultraviolet absorber to be described later, an organic light stabilizer to be described later, a curing catalyst to be described later, an antioxidant, a surface modifier, a leveling agent, an anti-sagging agent, a thickening agent, an antifoaming agent and a conductive filler. The bonding layer forming agent may contain water or an organic solvent. Such water or an organic solvent is removed at the time of forming the bonding layer.

From the viewpoint of film formability and bondability, the thickness of the bonding layer is preferably from 0.004 to 0.1 mm, more preferably from 0.01 to 0.06 mm.

The substrate film layer in the present invention functions as a support film for supporting the respective layers at the time of producing the decorative film.

Specific examples of the material constituting the substrate film layer may be polyvinyl chloride, polypropylene, polyester, polycarbonate, a (meth)acrylic resin, polyvinylidene fluoride, and an ethylene-tetrafluoroethylene type polymer. Among them, at least one member of a polyester and a polyolefin is preferred, and from the viewpoint of low-temperature workability, a polyester is more preferred.

The thickness of the substrate film layer is preferably from 0.01 to 0.5 mm, more preferably from 0.02 to 0.3 mm.

The substrate film layer may have an uneven pattern on at least one side. The uneven pattern can be formed by a processing method such as emboss processing, hairline processing, chemical etching, etc. If the substrate film has an uneven pattern, the uneven pattern will be imparted also to a decorative film after peeling the substrate film, whereby it is possible to impart a design property due to the uneven pattern to a three-dimensionally molded article with the decorative film.

The clear layer in the present invention is made by using a fluorinated polymer, whereby it is excellent in antifouling properties, durability/weather resistance and chemical resistance. Therefore, also a three-dimensionally molded article with the decorative film having the clear layer has the same effects.

The clear layer is required only to use a fluorinated polymer, and the fluorinated polymer to be contained in the clear layer may be crosslinked or may not be crosslinked. From the viewpoint of the hardness of the clear layer, the fluorinated polymer to be contained in the clear layer is preferably crosslinked. In any case, the clear layer already forms a uniform layer before it is subjected to the production of a three-dimensionally molded article with a decorative film. Therefore, at the time of press bonding the decorative film and the three-dimensionally molded article in a reduced pressure atmosphere, it is possible to suppress volatilization of components contained in layers other than the clear layer.

The clear layer can be formed, for example, by a clear layer forming agent containing a fluorinated polymer.

The fluoroolefin which becomes units F in the fluorinated polymer in the present invention, is an olefin having at least one of hydrogen atoms substituted by a fluorine atom. The fluoroolefin may be one wherein at least one of hydrogen atoms not substituted by a fluorine atom may be substituted by a chlorine atom.

Specific examples of the fluoroolefin may be $CF_2=CF_2$, $CF_2=CFCl$, $CF_2=CHF$, $CH_2=CF_2$, $CF_2=CFCF_3$, $CF_2=CHCF_3$, $CF_3CH=CHF$, and $CF_3CF=CH_2$. As the fluoroolefin, from the viewpoint of copolymerizability and chemical resistance, $CF_2=CF_2$, $CF_2=CFCl$, $CF_3CH=CHF$ and $CF_3CF=CH_2$ are preferred; $CF_2=CF_2$ and $CF_2=CFCl$ are more preferred; and $CF_2=CFCl$ is particularly preferred. As the fluoroolefin, two or more types may be used in combination.

The content of units F is from 20 to 70 mol %, preferably from 40 to 60 mol %, to all units which the fluorinated polymer comprises, from the viewpoint of releasability and weather resistance of the decorative film.

In the present invention, units 1 which the fluorinated polymer comprises, are units having no crosslinkable groups, and are units based on at least one type of monomer (monomer 1) selected from the group consisting of a vinyl ether, a vinyl ester, an allyl ether, an allyl ester and a (meth)acrylic acid ester. Units 1 preferably have no fluorine atom.

Units 1 preferably have a $C_{4-8}$ alkyl group represented by the formula $—C(Y^{10})_3$ or a $C_{6-10}$ cycloalkyl group. $Y^{10}$ are each independently a $C_{1-5}$ alkyl group. In this case, it is possible to adjust Tg of the fluorinated polymer to be high, whereby it is possible to prevent penetration of a drug and to obtain a clear layer excellent in chemical resistance.

Units 1 are preferably units based on a monomer represented by the formula $X^1—Y^1$.

$X^1$ is $CH_2=CHC(O)O—$, $CH_2=C(CH_3)C(O)O—$, $CH_2=CHOC(O)—$, $CH_2=CHCH_2OC(O)—$, $CH_2=CHO—$ or $CH_2=CHCH_2O—$. As $X^1$, from the viewpoint of excellent weather resistance of the decorative film, $CH_2=CHOC(O)—$, $CH_2=CHCH_2OC(O)—$, $CH_2=CHO—$ and $CH_2=CHCH_2O—$ are preferred.

$Y^1$ is a $C_{1-24}$ monovalent hydrocarbon group. The monovalent hydrocarbon group may be linear or branched. Further, the monovalent hydrocarbon group may be made from a ring structure, or it may contain a ring structure. Further, the monovalent hydrocarbon group may be a monovalent saturated hydrocarbon group or a monovalent unsaturated hydrocarbon group.

As the monovalent hydrocarbon group, an alkyl group, a cycloalkyl group, an aryl group and an aralkyl group are preferred, and a $C_{2-12}$ alkyl group, a $C_{6-10}$ cycloalkyl group, a $C_{6-10}$ cycloalkylalkyl group, a $C_{6-10}$ aryl group and a $C_{7-12}$ aralkyl group are more preferred.

Specific examples of the alkyl group may be a methyl group, an ethyl group, a tert-butyl group, a hexyl group, a nonyl group, a decyl group, and a dodecyl group.

A specific example of the cycloalkyl group may be a cyclohexyl group.

A specific example of the cycloalkylalkyl group may be a cyclohexylmethyl group.

A specific example of the aralkyl group may be a benzyl group.

Specific examples of the aryl group may be a phenyl group and a naphthyl group.

Here, a hydrogen atom in a cycloalkyl moiety of a cycloalkyl group and cycloalkylalkyl group, or in an aryl moiety of an aryl group and aralkyl group, may be substituted by an alkyl group. In such a case, the number of carbon atoms in the alkyl group as a substituent, shall not be included in the number of carbon atoms in the cycloalkyl group, or the aryl group.

As the monomer 1, two or more types may be used in combination.

Specific examples of the monomer 1 may be ethyl vinyl ether, tert-butyl vinyl ether, 2-ethylhexyl vinyl ether, cyclohexyl vinyl ether, vinyl acetate, vinyl pivalate, vinyl neononanoate (manufactured by HEXION, trade name: "VeoVa 9"), vinyl neodecanoate (manufactured by HEXION, trade name: "VeoVa 10"), vinyl benzoate, tert-butyl (meth)acrylate, and benzyl (meth)acrylate.

The content of units 1 is preferably from 5 to 60 mol %, more preferably from 10 to 50 mol %, to all units which the fluorinated polymer comprises.

In a case where units 1 are units based on a monomer represented by the formula $X^1—Y^1$, the fluorinated polymer in the present invention preferably contains units (hereinafter referred to also as "units 11") based on a monomer (hereinafter referred to also as "monomer 11") represented by the formula $X^1—Y^1$, wherein $Y^1$ is a $C_{4-8}$ alkyl group represented by the formula $—C(Y^{10})_3$ or a $C_{6-10}$ cycloalkyl group. $Y^{10}$ are each independently a $C_{1-5}$ alkyl group. In this case, it is possible to adjust Tg of the fluorinated polymer to be high, whereby it is possible to prevent penetration of a drug and to obtain a clear layer excellent in chemical resistance.

As the monomer 11, two or more types may be used in combination.

From such a viewpoint that the above effects will be more exhibited, the content of units 11 is preferably from 5 to 60 mol %, more preferably from 10 to 50 mol %, to all units which the fluorinated polymer comprises.

In the present invention, units 2 which the fluorinated polymer comprises, are units each having a crosslinkable group. Units 2 may be units based on a monomer (hereinafter referred to also as "monomer 2") having a crosslinkable group, or may be units obtainable by converting crosslinkable groups in a fluorinated polymer containing units 2 to different crosslinkable groups. Such units may be units obtainable by reacting a polycarboxylic acid or its acid anhydride to a fluorinated polymer containing units having hydroxy groups, and converting some or all of the hydroxy groups to carboxy groups. Units 2 preferably have no fluorine atom.

As specific examples of the crosslinkable group which units 2 have, a hydroxy group, a carboxy group, an amino group, and an alkoxysilyl group may be mentioned, and from such a viewpoint that the tensile strength of the clear layer will be further improved, a hydroxy group and a carboxy group are preferred.

Units 2 are preferably units based on the monomer 2. The monomer 2 is preferably at least one member selected from the group consisting of a monomer having a hydroxy group, and a monomer having a carboxy group.

The monomer 2 having a carboxy group may be an unsaturated carboxylic acid, (meth)acrylic acid, etc., and a monomer (hereinafter referred to also as "monomer 21") represented by the formula $X^{21}$—$Y^{21}$ is preferred.

$X^{21}$ is $CH_2=CH—$, $CH(CH_3)=CH—$ or $CH_2=C(CH_3)—$ and is preferably $CH_2=CH—$ or $CH(CH_3)=CH—$.

$Y^{21}$ is a carboxy group or a $C_{1-12}$ monovalent saturated hydrocarbon group having a carboxy group, and a carboxy group or a $C_{1-10}$ carboxyalkyl group is preferred.

The monomer 2 having a hydroxy group may be a vinyl ether, a vinyl ester, an allyl ether, an allyl ester, a (meth)acrylic acid ester, allyl alcohol, etc. having a hydroxy group, and a monomer (hereinafter referred to also as "monomer 22") represented by the formula $X^{22}$—$Y^{22}$ or allyl alcohol is preferred.

$X^{22}$ is $CH_2=CHC(O)O—$, $CH_2=C(CH_3)C(O)O—$, $CH_2=CHOC(O)—$, $CH_2=CHCH_2OC(O)—$, $CH_2=CHO—$ or $CH_2=CHCH_2O—$, and $CH_2=CHO—$ or $CH_2=CHCH_2O—$ is preferred.

$Y^{22}$ is a $C_{2-12}$ monovalent saturated hydrocarbon group having a hydroxy group. The monovalent saturated hydrocarbon group may be linear or branched. Further, the monovalent saturated hydrocarbon group may be made from a ring structure, or it may contain a ring structure.

The monovalent saturated hydrocarbon group is preferably a $C_{2-6}$ alkyl group, or an alkyl group containing a $C_{6-8}$ cycloalkylene group.

Specific examples of the monomer 21 may be $CH_2=CHCOOH$, $CH(CH_3)=CHCOOH$, $CH_2=C(CH_3)COOH$, and a compound represented by the formula $CH_2=CH(CH_2)_{n2}COOH$ (where n2 is an integer of from 1 to 10).

Specific examples of the monomer 22 may be $CH_2=CHO—CH_2$-$cycloC_6H_{10}—CH_2OH$, $CH_2=CHCH_2O—CH_2$-$cycloC_6H_{10}—CH_2OH$, $CH_2=CHOCH_2CH_2OH$, $CH_2=CHCH_2OCH_2CH_2OH$, $CH_2=CHOCH_2CH_2CH_2OH$, and $CH_2=CHCH_2OCH_2CH_2CH_2OH$. Here, the above -$cycloC_6H_{10}—$ represents a cyclohexylene group.

As the monomer 2, two or more types may be used in combination.

In a case where the clear layer forming agent contains a curing agent, crosslinkable groups of units 2 become crosslinking points, and the crosslinking reaction between the fluorinated polymers proceeds via the curing agent, whereby the hardness of the clear layer will be improved, and the coating film properties such as the weather resistance, water resistance, chemical resistance, heat resistance, etc. will be improved. In this case, the clear layer has a crosslinked structure via the curing agent at the crosslinkable groups of units 2 which the fluorinated polymer comprises.

From such a viewpoint that the fluorinated polymer will be densely crosslinked, the content of units 2 is preferably from 1 to 40 mol %, more preferably from 3 to 40 mol %, particularly preferably from 3 to 25 mol %, further preferably from 5 to 25 mol %, most preferably from 5 to 20 mol %, to all units which the fluorinated polymer comprises.

The fluorinated polymer is particularly preferably a fluorinated polymer containing units F, units 1 and units 2 in amounts, respectively, of from 20 to 70 mol %, from 5 to 60 mol % and from 1 to 25 mol %, to all units which the fluorinated polymer comprises, or a fluorinated polymer containing units F, units 1 and units 2 in amounts, respectively, of from 20 to 70 mol %, from 5 to 60 mol % and from 3 to 40 mol %, to all units which the fluorinated polymer comprises. Since the fluorinated polymer comprises the respective units in the above-mentioned proportions, the decorative film of the present invention is excellent in tensile strength and moldability, is excellent in chemical resistance (particularly acid resistance) and durability to ultraviolet rays, and further has a high total light transmittance and thus is excellent in a design property.

From such a viewpoint that the chemical resistance of the decorative film will be improved, Tg of the fluorinated polymer is preferably from 25 to 120° C., more preferably from 30 to 120° C.

From the viewpoint of followability of the clear layer, Mn of the fluorinated polymer, is preferably from 2,000 to 30,000, more preferably from 5,000 to 20,000, particularly preferably from 7,000 to 18,000.

In a case where the fluorinated polymer is a fluorinated polymer containing units based on monomer 21, the acid value of the fluorinated polymer is, from the viewpoint of tensile strength of the decorative film, preferably from 1 to 150 mgKOH/g, more preferably from 3 to 100 mgKOH/g, particularly preferably from 5 to 50 mgKOH/g.

In a case where the fluorinated polymer is a fluorinated polymer containing units based on monomer 22, the hydroxy value of the fluorinated polymer is, from the viewpoint of tensile strength of the decorative film, preferably from 1 to 150 mgKOH/g, more preferably from 5 to 150 mgKOH/g, particularly preferably from 30 to 150 mgKOH/g, further preferably from 30 to 120 mgKOH/g, most preferably from 80 to 120 mgKOH/g.

The fluorinated polymer may have both an acid value and a hydroxy value, and in such a case, the sum of the acid value and the hydroxy value is preferably from 1 to 150 mgKOH/g.

The content of the fluorinated polymer in the clear layer forming agent is preferably from 10 to 70 mass %, to the total solid content of the clear layer forming agent.

The content of the fluorinated polymer (a crosslinked fluorinated polymer as a reaction product with a curing agent, is also meant) in the clear layer is preferably from 10 to 100 mass %, particularly preferably from 50 to 99 mass %, to the total mass of the clear layer.

From the viewpoint of the design property of the three-dimensionally molded article with the decorative film of the present invention, the total light transmittance of the clear layer is preferably at least 70%, more preferably at least 80%, particularly preferably at least 90%.

From the viewpoint of weather resistance of the decorative film, the ultraviolet transmittance (light transmittance at a wavelength of from 10 to 400 nm) of the clear layer is preferably at most 10%, particularly preferably at most 5%.

In the case of using an ultraviolet absorber which will be described later, it is preferred to add it so that the total light transmittance and the ultraviolet transmittance of the clear layer will be adjusted to be within the above ranges.

The clear layer forming agent preferably contains a curing agent.

The curing agent is a compound having two or more groups reactive with the crosslinkable groups, per molecule. By the reaction of the curing agent with crosslinkable groups of the fluorinated polymer, the fluorinated polymer will be crosslinked, and the clear layer will be cured. The curing agent usually has from 2 to 30 groups reactive with the crosslinkable groups.

As the curing agent in a case where the fluorinated polymer contains units based on monomer 21, preferred is a compound having at least two epoxy groups, carbodiimide groups, oxazoline groups or p-hydroxyalkylamide groups in one molecule.

As the curing agent in a case where the fluorinated polymer contains units based on monomer 22, preferred is a compound having at least two isocyanate groups or blocked isocyanate groups in one molecule.

As the compound having at least two isocyanate groups in one molecule, a polyisocyanate monomer or a polyisocyanate derivative is preferred.

As the polyisocyanate monomer, an alicyclic polyisocyanate, an aliphatic polyisocyanate, or an aromatic polyisocyanate is preferred. As the polyisocyanate derivative, a multimer or modified product of a polyisocyanate monomer is preferred. The modified product may be a polyol modified product, an isocyanate-terminated polyurethane prepolymer or the like.

Specific examples of the aliphatic polyisocyanate may be tetramethylene diisocyanate, pentamethylene diisocyanate, hexamethylene diisocyanate, 2,2,4-trimethyl-1,6-diisocyanatohexane, and an aliphatic diisocyanate such as lysine diisocyanate, as well as lysine triisocyanate, 4-isocyanatomethyl-1,8-octamethylene diisocyanate, and bis(2-isocyanatoethyl) 2-isocyanato glutarate.

Specific examples of the alicyclic polyisocyanate may be alicyclic diisocyanates such as isophorone diisocyanate, 1,3-bis(isocyanatomethyl)-cyclohexane, 4,4'-dicyclohexylmethane diisocyanate, norbornene diisocyanate, and hydrogenated xylylene diisocyanate.

Specific examples of the aromatic polyisocyanate may be aromatic diisocyanates such as 2,4-tolylene diisocyanate, 2,6-tolylene diisocyanate, 4,4'-diphenylmethane diisocyanate, naphthalene diisocyanate, and xylylene diisocyanate.

As the compound having at least two blocked isocyanate groups in one molecule, preferred is a compound having at least two isocyanate groups of the above polyisocyanate monomer or polyisocyanate derivative blocked by a blocking agent.

The blocking agent is a compound having an active hydrogen, and specific examples may be an alcohol, a phenol, active methylene, an amine, an imine, an acid amide, a lactam, an oxime, a pyrazole, an imidazole, an imidazoline, a pyrimidine, and guanidine.

Specific examples of the compound having at least two epoxy groups in one molecule may be a bisphenol type epoxy compound (A-type, F-type, S-type, etc.), a diphenyl ether type epoxy compound, a hydroquinone-type epoxy compound, a naphthalene type epoxy compound, a biphenyl type epoxy compound, a fluorene type epoxy compound, a hydrogenated bisphenol A type epoxy compound, a bisphenol A-containing nuclear polyol type epoxy compound, a polypropylene glycol type epoxy compound, a glycidyl ester type epoxy compound, a glycidyl amine type epoxy compound, a glyoxal type epoxy compound, an alicyclic type epoxy compound, an alicyclic polyfunctional epoxy compound, and a heterocyclic epoxy compound (triglycidyl isocyanurate, etc.).

Specific examples of the compound having at least two carbodiimide groups in one molecule may be an alicyclic carbodiimide, an aliphatic carbodiimide, an aromatic carbodiimide, and their multimers and modified products.

Specific examples of the compound having at least two oxazoline groups in one molecule may be an addition polymerizable oxazoline having 2-oxazoline groups, and a polymer of such an addition-polymerizable oxazoline.

Specific examples of the compound having at least two p-hydroxyalkylamide groups in one molecule may be N,N,N',N'-tetrakis-(2-hydroxyethyl)-adipamide (PrimidXL-552, manufactured by EMS) and N,N,N',N'-tetrakis-(2-hydroxypropyl)-adipamide (Primid QM 1260 PrimidXL-552, manufactured by EMS).

In a case where the clear layer forming agent contains a curing agent, the content of the curing agent is preferably from 10 to 200 parts by mass, more preferably from 50 to 150 parts by mass, to 100 parts by mass of the fluorinated polymer in the clear layer forming agent.

In a case where the clear layer contains an unreacted curing agent, the content of the curing agent is preferably from 1 to 200 parts by mass to 100 parts by mass of the fluorinated polymer in the clear layer.

The clear layer forming agent and the clear layer may contain a curing catalyst. The curing catalyst is a compound to promote the curing reaction at the time of using a curing agent, and may be selected from known curing catalysts depending on the type of the curing agent.

From the viewpoint of weather resistance of the decorative film of the present invention, the clear layer forming agent and the clear layer preferably contain at least one member selected from the group consisting of an organic ultraviolet absorber and an organic light stabilizer. That is, the clear layer forming agent and the clear layer may contain both an organic ultraviolet absorber and an organic light stabilizer, or may contain only one of them.

The organic ultraviolet absorber is a compound which protects the decorative film from ultraviolet rays.

As the organic ultraviolet absorber, a salicylate type, benzotriazole type, benzophenone type, cyanoacrylate type or triazine type compound is preferred.

Specific examples of the organic ultraviolet absorber may be "Tinuvin 326" (molecular weight: 315.8, melting point: 139° C.), "Tinuvin 405" (molecular weight: 583.8, melting point: 74 to 77° C.), "Tinuvin 460" (molecular weight: 629.8, melting point: 93 to 102° C.), "Tinuvin 900" (molecular weight: 447.6, melting point: 137 to 141° C.) and "Tinuvin 928" (molecular weight: 441.6, melting point: 109 to 113° C.) manufactured by BASF; "Sanduvor VSU powder" (molecular weight: 312.0, melting point: 123 to 127° C.) manufactured by Clariant; and "Hastavin PR-25 Gran" (molecular weight: 250.0, melting point: 55 to 59° C.) manufactured by Clariant.

As the organic ultraviolet absorber, two or more types may be used in combination.

In a case where the clear layer forming agent contains an organic ultraviolet absorber, in view of the total light transmittance and the ultraviolet transmittance of the clear layer, the content of the organic ultraviolet absorber is preferably from 0.001 to 1 mass %, more preferably from 0.005 to 0.1 mass %, to the total solid content of the clear layer forming agent.

In a case where the clear layer contains an organic ultraviolet absorber, the content of the organic ultraviolet absorber is preferably from 0.001 to 1 mass %, more preferably from 0.005 to 0.1 mass %, particularly preferably from 0.010 to 0.050 mass %, to the total mass of the clear layer.

The organic light stabilizer is a compound to improve the light resistance of the decorative film.

As the organic light stabilizer, a hindered amine compound is preferred. Specific examples of the hindered amine compound may be "Tinuvin 111FDL" (molecular weight: 2,000 to 4,000, melting point: 63° C.), "Tinuvin 144" (molecular weight: 685, melting point: 146 to 150° C.) and "Tinuvin 152" (molecular weight: 756.6, melting point: 83 to 90° C.) manufactured by BASF; "Sanduvor 3051 powder" (molecular weight: 364.0, melting point: 225° C.) manufactured by Clariant; "Sanduvor 3070 powder" (molecular weight: 1,500, melting point: 148° C.) manufactured by Clariant; and "VP Sanduvor PR-31" (molecular weight: 529, melting point: 120 to 125° C.) manufactured by Clariant.

As the organic light stabilizer, two or more types may be used in combination.

In a case where the clear layer forming agent contains an organic light stabilizer, the content of the organic light stabilizer is preferably from 0.001 to 20 mass %, more preferably from 0.01 to 15 mass %, particularly preferably from 0.1 to 3 mass %, to the total solid content of the clear layer forming agent.

In a case where the clear layer contains an organic light stabilizer, the content of the organic light stabilizer is preferably from 0.001 to 10 mass %, more preferably from 0.1 to 3 mass %, to the total mass of the clear layer.

The clear layer forming agent and the clear layer preferably contain a plasticizer. The plasticizer further improves the flexibility of the clear layer, whereby moldability of the decorative film will be further improved. In a case where the plasticizer is a plasticizer having a hydroxy group, such a plasticizer may react with the curing agent at the time of forming the clear layer.

Specific examples of the plasticizer may be a plasticizer made of a (meth)acrylic resin, a plasticizer made of a polyether glycol, a plasticizer made of a polycarbonate polyol, a plasticizer made of a polyester polyol, a plasticizer made of a polyrotaxane, etc., and a plasticizer made of a (meth)acrylic resin or a plasticizer made of a polyether glycol is preferred.

Specific examples of the plasticizer made of a (meth) acrylic resin may be trade name "ARUFON UP-1000" (Mw: 3,000, Tg: −77° C.), "ARUFON UP-1010" (Mw: 1,700, Tg: −31° C.), "ARUFON UP-1020" (Mw: 2,000, Tg: −80° C.), "ARUFON UP-1021" (Mw: 1,600, Tg: −71° C.), "ARUFON UP-1110" (Mw: 2,500, Tg: −64° C.), "ARUFON UH-2032" (Mw: 2,000, Tg: −60° C.), "ARUFON UH-2041" (Mw: 2,500, Tg: −50° C.), "ARUFON UC-3510" (Mw: 2,000, Tg: −50° C.), "ARUFON UG-4000" (Mw: 3,000, Tg: −61° C.), "ARUFON UG-4010" (Mw: 2,900, Tg: −57° C.) and "ARUFON US-6110" (Mw: 2,500, Tg: −57° C.) manufactured by Toagosei Co., Ltd.

From such a viewpoint that the decorative film will be provided with flexibility and tensile strength, Mw of the plasticizer made of a (meth)acrylic resin is preferably from 1,000 to 20,000, more preferably from 1,000 to 10,000, particularly preferably from 1,500 to 5,000.

In a case where the plasticizer is a polymeric plasticizer (particularly a plasticizer made of a (meth)acrylic resin), from such a viewpoint that the decorative film will be provided with flexibility and chemical resistance, Tg of the plasticizer is preferably from −80° C. to 0° C., particularly preferably from −80° C. to −30° C.

Specific examples of the plasticizer made of a polyether glycol may be trade name "TERATHANE PTMEG 250" (Mw: 230 to 270), "TERATHANE PTMEG 650" (Mw: 625 to 675), "TERATHANE PTMEG 1000" (Mw: 950 to 1,050), "TERATHANE PTMEG 1400" (Mw: 1,350 to 1,450), "TERATHANE PTMEG 1800" (Mw: 1,700 to 1,900), "TERATHANE PTMEG 2000" (Mw: 1,900 to 2,100), and "TERATHANE PTMEG 2900" (Mw: 2,825 to 2,976) manufactured by INVISTA.

From such a viewpoint that the decorative film will be provided with flexibility and tensile strength, Mw of the plasticizer made of a polyether glycol is preferably from 100 to 10,000, more preferably from 100 to 5,000, particularly preferably from 200 to 3,000.

As the plasticizer, two or more types may be used in combination.

In a case where the clear layer forming agent contains a plasticizer, the content of the plasticizer is preferably from 0.1 to 10 mass %, more preferably from 1 to 5 mass %, to the total solid content of the clear layer forming agent.

In a case where the clear layer contains a plasticizer, the content of the plasticizer is preferably from 0.1 to 10 mass %, particularly preferably from 0.1 to 4 mass %, to the total mass of the clear layer.

The clear layer forming agent and clear layer may contain, as the case requires, components other than those described above, for example, various media (water, an organic solvent, etc.), a filler (an inorganic filler such as silica, an organic filler such as resin beads, etc.), an inorganic ultraviolet absorber, a matting agent, a leveling agent, a surface modifier, a degassing agent, a packing agent, a heat stabilizer, a thickener, a dispersing agent, a surfactant, an antistatic agent, a rust inhibitor, a silane coupling agent, an antifouling agent, and a low pollution treatment agent.

The thickness of the clear layer is preferably from 1 to 200 μm, more preferably from 5 to 100 μm. The decorative film of the present invention is excellent in moldability and tensile strength of the clear layer, whereby it is excellent in moldability regardless the thickness of the decorative film.

The decorative film of the present invention may have a design layer. The design layer is a layer for imparting a design property to a three-dimensionally molded article.

The design layer may, for example, be a layer formed by using a design layer forming agent, a layer formed by a printing method, or a layer formed by a metal vapor deposition method.

The layer formed by using a design layer forming agent is formed by applying the design layer forming agent. Components to be contained in the design layer forming agent include a binder resin (a urethane resin, a (meth) acrylic resin, etc.), a colorant (a dye, an organic pigment, an inorganic pigment, a luster pigment using a metal or mica, etc.), a solvent (water, an organic solvent, etc.), etc.

The layer formed by a printing method is formed by using an ink (comprising e.g. a binder resin, a colorant and a solvent) suitable for each printing method such as inkjet printing, screen printing, offset printing or flexographic printing.

The layer formed by a metal vapor deposition method is formed by using a metal such as aluminum, indium, tin or the like.

The design layer may contain, as the case requires, components other than those mentioned above, specifically the components listed in the bonding layer forming agent or the components listed in the clear layer forming agent.

The layer thickness of the design layer is not particularly limited and may suitably be set depending on the particular application.

The decorative film of the present invention may have layers other than the above, for example, a release layer and a protective layer.

The release layer is a layer to be provided in a case where, like the decorative film 10 in FIG. 1, the substrate film layer 16 is finally peeled. In the embodiment of FIG. 1, it is preferred that a release layer is provided between the substrate film layer 16 and the clear layer 14 in contact with the substrate film layer 16. The release layer may be formed by using, for example, a silicone type release agent.

The protective layer is a layer which may be provided for protection of the design layer, and is preferably provided in contact with the design layer. The protective layer may be formed by using a resin such as a (meth)acrylic resin, a urethane resin or an acrylonitrile-butadiene-styrene (ABS) resin.

Each layer other than the substrate film layer constituting the decorative film of the present invention is formed, for example, by applying each forming agent having components to constitute each layer dissolved in a solvent (water, an organic solvent, etc.) onto a substrate film, followed by drying.

As a specific example for the method of applying each forming agent, a method of using a spray, an applicator, a die coater, a bar coater, a roll coater, a comma coater, a roller brush, a brush or a spatula may be mentioned.

After applying each forming agent, heat-drying may be carried out in order to remove the solvent in the forming agent. Further, in a case where the forming agent contains a curing agent, it may be crosslinked by e.g. heating.

Here, as described above, the design layer may also be formed by a method (a printing method or a vapor deposition method) other than coating.

Further, the bonding layer may be preliminarily formed into a film shape, which may be laminated on an optional layer.

The three-dimensionally molded article with a decorative film of the present invention (hereinafter referred to also as "the present molded article") is obtainable by press-bonding a layer (such as the substrate film layer) other than the clear layer of the above-mentioned decorative film, and the surface to be decorated, of a three-dimensionally molded article. In a case where the decorative film has a bonding layer, the present molded article is preferably obtained by press-bonding the bonding layer and the surface to be decorated, of a three-dimensionally molded article in a reduced pressure atmosphere. At the time of press-bonding, it is preferred to conduct heating simultaneously.

The press-bonding method in a reduced pressure atmosphere in the production method for the present molded article, is also referred to as a vacuum molding method, and may, for example, be conducted by using a double-sided vacuum molding device.

The reduced pressure atmosphere means a state where the pressure is lower than the standard atmospheric pressure. Specifically, the pressure in a reduced pressure atmosphere is preferably at most 70 kPa.

In a case where the clear layer contains a fluorinated polymer and a curing agent, in the production method for the present molded article, after bonding the bonding layer of the decorative film and the surface to be decorated, of a three-dimensionally molded article, in a reduced pressure atmosphere, the fluorinated polymer and the curing agent may be reacted, or while press-bonding in a reduced pressure atmosphere, the fluorinated polymer and the curing agent may be reacted, or a decorative film having a clear layer obtained by preliminarily reacting the fluorinated polymer and a curing agent, may be used.

The heating temperature for softening of a heat-fusible resin of the bonding layer, for thermal cross-linking of a thermally crosslinkable resin, or for reacting the fluorinated polymer and the curing agent in the clear layer, is preferably from 50 to 150° C.

The three-dimensionally molded article with a decorative film of the present invention may be obtained optionally by a molding method other than the vacuum molding method. Examples of such a molding method may be in-mold molding, in-mold transfer molding, in-mold lamination molding, overlay transfer molding, overlay lamination molding, water pressure transfer, etc. Further, a three-dimensionally molded article with a decorative film may be obtained by processing after press bonding the decorative film to a three-dimensionally molded article before molding.

In the case of using the decorative film 10 as shown in FIG. 1, the present molded article is obtainable by peeling off the substrate film layer after the press bonding in a reduced pressure atmosphere. In such a case, the crosslinking reaction of the fluorinated polymer in the above-described clear layer may be carried out in either timing of before or after the peeling of the substrate film layer.

Specific examples of the material constituting the three-dimensionally molded article may be a polypropylene, an ABS resin and a polycarbonate.

Specific examples of the three-dimensionally molded article may be automobile exterior parts such as a door mirror, a front under spoiler, a rear under spoiler, a side under skirt, a bumper, a side garnish, etc., automobile interior parts such as a center console, an instrument panel, a door switch panel, etc., a liquid crystal surface of a display, etc.

The decorative film of the present invention is excellent in moldability and tensile strength, and thus is used particularly usefully for automobile exterior parts and automobile interior parts which are required to be in the use of a large area and to have a high level of appearance. Further, the decorative film of the present invention is excellent also in chemical resistance and durability to ultraviolet rays, and thus is used particularly suitably for automobile exterior parts which are exposed to wind and rain (especially acid rain), sunlight, etc.

EXAMPLES

Hereinafter, the present invention will be described in detail with reference to Examples. However, the present invention is not limited to these Examples. Further, the amounts of the respective components in Tables given later, are by mass. Ex. 1 to 11 and Ex. 13 to 16 are Examples of the present invention, and Ex. 12 and Ex. 17 are Comparative Examples.

<Components Used>
(Fluorinated Polymer)

Monomer F: $CF_2$=CFCl (CTFE), $CF_3$CH=CHF (HFO—1234ze), $CF_3$CF=$CH_2$ (HFO—1234yf)

Monomer 1: neononanoic acid vinyl ester (V9, corresponding also to monomer 11) (manufactured by HEXION, trade name "VeoVa 9"), cyclohexyl vinyl ether (CHVE, corresponding also to monomer 11), ethyl vinyl ether (EVE)

Monomer 2: 4-hydroxybutyl vinyl ether (HBVE), 10-undecylenic acid (UDA)

(Additives)

Curing catalyst: a butyl acetate solution of dibutyltin dilaurate (10,000-fold diluted product)

Plasticizer 1: ARUFON UC-3510 (trade name, manufactured by Toagosei Co., Ltd., an acrylic resin, Mw: 2,000, Tg: −50° C.)

Plasticizer 2: TERATHANE PTMEG 1000 (trade name, manufactured by INVISTA, polytetramethylene ether glycol, Mw: 1,000)

Plasticizer 3: NeoCryl B-723 (trade name, manufactured by DSM Coating Resins, a (meth)acrylic resin, Mw: 200,000, Tg: 54° C.)

Curing agent: Duranate E405-70B (trade name, manufactured by Asahi Kasei Corporation, a compound having two or more isocyanate groups in one molecule)

Organic ultraviolet absorber: Tinuvin 326 (trade name, manufactured by BASF)

Organic light stabilizer: Tinuvin 111FDL (trade name, manufactured by BASF)

Production Example 1 for Fluorinated Polymer

In an autoclave, xylene (503 g), ethanol (142 g), CTFE (387 g), CHVE (326 g), HBVE (84.9 g), potassium carbonate (12.3 g) and a 50 mass % xylene solution (20 mL) of tert-butyl peroxypivalate were introduced and heated and polymerized at 65° C. for 11 hours. Subsequently, the solution in the autoclave was filtered to obtain a solution containing a fluorinated polymer 1.

The solution containing the fluorinated polymer 1 was vacuum dried at 65° C. for 24 hours to remove the solvent, further vacuum dried at 130° C. for 20 minutes, and then dissolved in butyl acetate to obtain a butyl acetate solution of the fluorinated polymer 1 (fluorinated polymer concentration: 50 mass %).

The fluorinated polymer 1 was a polymer comprising units based on CTFE, units based on CHVE and units based on HBVE in amounts, in this order, of 50 mol %, 39 mol % and 11 mol %. The hydroxy value of the fluorinated polymer 1 was 50 mgKOH/g, Tg was 52° C., and Mn was 10,000.

Production Examples 2 to 6 for Fluorinated Polymers

Butyl acetate solutions containing fluorinated polymers 2 to 6 (fluorinated polymer concentration: 50 mass %) were obtained in the same manner as in Production Example 1 except that the type and amount of the monomer to be used were changed as shown in Table 1.

The details of the fluorinated polymers 1 to 6 are shown in Table 1.

TABLE 1

| | | | Production Examples for fluorinated polymers | | | | | |
|---|---|---|---|---|---|---|---|---|
| | | | 1 | 2 | 3 | 4 | 5 | 6 |
| No. of fluorinated polymer | | | 1 | 2 | 3 | 4 | 5 | 6 |
| Contents of units (mol %) | Units F | CTFE | 50 | 50 | 40 | | 50 | 50 |
| | | HFO-1234ze | | | | 40 | | |
| | | HFO-1234yf | | | | 10 | | |
| | Units 1 | V9 | | | 53 | 24 | | |
| | | CHVE | 39 | 25 | | | | 39 |
| | | EVE | | | 21 | 39 | 10 | |
| | Units 2 | HBVE | 11 | 25 | | | 11 | 1 |
| | | UDA | | | 7 | 5 | | |
| Hydroxy value (mgKOH/g) | | | 50 | 118 | | | 50 | 4.3 |
| Acid value (mgKOH/g) | | | | | 31 | 25 | | |
| Mn | | | 10,000 | 7,000 | 9,800 | 8,000 | 9,000 | 8,700 |
| Tg (° C.) | | | 52 | 45 | 51 | 42 | 28 | 54 |

Production Examples 1 to 12 for Clear Layer Forming Agents

Clear layer forming agents 1 to 11 were obtained by mixing the respective components as described in Table 2. The details of the amounts of the respective components are shown in Table 2. However, shown in parentheses in Table 2, is the mass (g) of the fluorinated polymer in the butyl acetate solution of the fluorinated polymer.

TABLE 2

| | | Production Examples for clear layer forming agents | | | | | | | | | | |
|---|---|---|---|---|---|---|---|---|---|---|---|---|
| | | 1 | 2 | 3 | 4 | 5 | 6 | 7 | 8 | 9 | 10 | 11 |
| No. of clear layer forming agent | | 1 | 2 | 3 | 4 | 5 | 6 | 7 | 8 | 9 | 10 | 11 |
| Type of fluorinated polymer | | 1 | 1 | 1 | 2 | 2 | 2 | 3 | 4 | 5 | 6 | 1 |
| Mass (g) of butyl acetate solution of fluorinated polymer | | 100 (50) | 80 (40) | 80 (40) | 100 (50) | 80 (40) | 80 (40) | 100 (50) | 100 (50) | 100 (50) | 100 (50) | 80 (40) |
| Additives (g) | Curing catalyst | 3 | 3 | 3 | 3 | 3 | 3 | 3 | 3 | 3 | 3 | 3 |
| | Plasticizer 1 | | 3 | | | 3 | | | | | | |
| | Plasticizer 2 | | | 3 | | | 3 | | | | | |
| | Plasticizer 3 | | | | | | | | | | | 3 |
| | Curing agent | 44 | 44 | 44 | 44 | 44 | 44 | 44 | 44 | 44 | 44 | 44 |
| | Organic UV absorber | 0.01 | 0.01 | 0.01 | 0.01 | 0.01 | 0.01 | 0.01 | 0.01 | 0.01 | 0.01 | 0.01 |
| | Organic light stabilizer | 0.8 | 0.8 | 0.8 | 0.8 | 0.8 | 0.8 | 0.8 | 0.8 | 0.8 | 0.8 | 0.8 |

Production of Decorative Film and Molded Article, and Evaluation Thereof

Ex. 1

On one surface of the substrate film (polyethylene terephthalate, the same applies hereinafter), the clear layer forming agent 1 was applied by using an applicator, dried at 25° C. and then cured by heating at 80° C. for 30 minutes to form a clear layer (layer thickness: 50 μm).

Then, on the above clear layer, a design layer forming agent (a methyl isobutyl ketone solution containing a urethane resin and a luster pigment (solid content concentration: 40 mass %), the same applies hereinafter) was applied, dried at 25° C. and then heated at 80° C. for 15 minutes to form a design layer (layer thickness: 20 μm).

Then, on the above design layer, a bonding layer forming agent (a solution containing a thermally crosslinkable urethane resin, the same applies hereinafter) was coated, dried at 25° C. and then heated at 80° C. for 15 minutes to form a bonding layer (layer thickness: 20 μm).

By the above method, a decorative film 1 was obtained wherein the substrate film layer, the clear layer, the design layer and the bonding layer are laminated in this order.

Further, using a double-sided vacuum molding apparatus, by a vacuum molding method, the decorative film 1 and a substrate (a three-dimensionally molded article, an ABS panel) were heated at 140° C. for 1 minute while press bonding them in a reduced pressure atmosphere. In the press bonding, the bonding layer of the decorative film 1 and the substrate were arranged so as to be in contact with each other. Thereafter, the substrate film was peeled off, to obtain a molded article 1 which is a three-dimensionally molded article with a decorative film.

The obtained decorative film 1 and the molded article 1 were subjected to evaluations as described later.

Ex. 2 to 12

Decorative films 2 to 12 and molded articles 2 to 12 were obtained in the same manner as in Ex. 1 except that the clear layer forming agent 1 was changed to a solution (polyvinylidene fluoride concentration: 30 mass %, hereinafter referred to also as "clear layer forming agent 12") containing a clear layer forming agent 2 to 11 and polyvinylidene fluoride (homopolymer of vinylidene fluoride), as shown in Table 3, and subjected to evaluations as described later.

(Releasability of the Clear Layer)

In the molded article obtained in each Ex., the surface state of the clear layer was confirmed by visual observation.

S: There is no abnormality in the appearance of the clear layer.

A: At 10% or less of the clear layer area, peeling of the clear layer, or adhesion of the substrate film is observed.

B: At more than 10% of the clear layer area, peeling of the clear layer, or adhesion of the substrate film is observed.

(Moldability of the Decorative Film)

In the obtained molded article in each Ex., the molding state of the decorative film was visually confirmed.

S: The decorative film is in close contact with the molded article.

A: At 10% or less of the decorative film area on the molded article, twisting or peeling of the decorative film is observed.

B: At more than 10% of the decorative film area on the molded article, twisting or peeling of the decorative film is observed.

(Tensile Strength of the Decorative Film)

Using Autograph AGS10KNG (manufactured by Shimadzu Corporation) and TERMOSTATIC CHAMBER Model: TCRI-200SP (manufactured by Shimadzu Corporation), with respect to the decorative film obtained in each Ex., a tensile test was carried out in the longitudinal direction under conditions of the decorative film size being short side: 10 mm×long side: 100 mm, the distance between chucks being 50 mm, the tensile speed being 50 mm/min, and the temperature of the tensile constant temperature vessel being 23° C., whereby the elongation of the decorative film until cracks were formed (i.e. the length between chucks, of the decorative film immediately before formation of cracks by the tensile test/the length between chucks before the tensile test×100) was measured.

S: The elongation of the decorative film is at least 130%.

A: The elongation of the decorative film is at least 125% and less than 130%.

B: The elongation of the decorative film is at least 120% and less than 125%.

C: The elongation of the decorative film is less than 120%.

(Ultraviolet Transmittance of the Clear Layer)

Each of clear layer forming agents 1 to 12 was applied on a polypropylene resin film by using an applicator, dried at 25° C. and then cured by heating at 80° C. for 30 minutes, to form a clear layer having a thickness 50 μm. Then, the clear layer was peeled off from the polypropylene resin film, to obtain a single layer of each of clear layers 1 to 12. With respect to the obtained respective clear layers, using the haze-gard plus manufactured by BYK Gardner, the total light transmittance of each clear layer was measured in accordance with JIS K 7361-1:1997, and the light transmittance at a wavelength of from 10 to 400 nm was evaluated as the ultraviolet transmittance. The lower the ultraviolet transmittance, the better the suppression of deterioration by ultraviolet rays, in layers present lower than the clear layer to ultraviolet rays, in the decorative film having the clear layer. Further, in the three-dimensionally molded article having a decorative film, the deterioration of the three-dimensionally molded article by ultraviolet rays will be suppressed.

(Hydrochloric Acid Resistance of the Decorative Film)

On the decorative film (on the clear layer) in a molded article obtained in each Ex., a cylindrical poly ring having an inner diameter of 40 mm and a height of 15 mm, was fixed. Further, a 10 mass % hydrochloric acid aqueous solution was prepared by ion-exchanged water and reagent grade hydrochloric acid.

Then, the hydrochloric acid aqueous solution was dropwise added in an amount of 5 mL to the inside of the poly ring on the decorative film in the molded article, and held for 4 hours with a lid. Then, the inside of the poly ring was washed with water, and the status of the decorative film at the inside of the poly ring was visually confirmed.

S: There is no abnormality in the appearance of the decorative film.

A: At 10% or less of the decorative film area, whitening or blistering is observed.

B: At more than 10% of the decorative film area, whitening or blistering is observed.

TABLE 3

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| No. of decorative film and molded article | 1 | 2 | 3 | 4 | 5 | 6 | 7 | 8 | 9 | 10 | 11 | 12 |
| No. of clear layer forming agent | 1 | 2 | 3 | 4 | 5 | 6 | 7 | 8 | 9 | 10 | 11 | 12 |
| Releasability of clear layer | S | S | S | S | S | S | S | S | S | S | S | S |
| Moldability of decorative film | S | S | S | S | S | S | S | S | S | S | S | B |
| Tensile strength of decorative film | A | S | S | S | S | S | A | A | A | B | B | C |
| Ultraviolet transmittance (%) of clear layer | 3.0 | 3.0 | 2.0 | 3.0 | 3.0 | 2.0 | 6.0 | 8.0 | 4.0 | 3.0 | 6.0 | 11.0 |
| Hydrochloric acid resistance of decorative film | S | S | S | S | S | S | S | S | A | S | A | A |

Ex. 13

On one surface of a substrate film, a clear layer forming agent 1 was applied by using an applicator, dried at 25° C. and then cured by heating at 80° C. for 30 minutes, to form a clear layer (layer thickness: 50 μm).

Then, on the surface having no clear layer formed in the substrate film, a design layer forming agent was applied, dried at 25° C. and then heated at 80° C. for 15 minutes to form a design layer (layer thickness: 20 μm).

Then, on the above design layer, a bonding layer forming agent was applied, dried at 25° C. and then heated at 80° C. for 15 minutes to form a bonding layer (layer thickness: 20 μm).

By the above method, a decorative film 13 having the clear layer, the substrate film layer, the design layer and the bonding layer laminated in this order was obtained.

Further, by using a double-sided vacuum molding apparatus, by a vacuum molding method, the decorative film 13 and a substrate (a three-dimensionally molded article, an ABS panel) were heated at 140° C. for 1 minute while press-bonding them under reduced pressure, to obtain a molded article 13 which is a three-dimensionally molded article with a decorative film having a clear layer. In the press bonding, the bonding layer of the decorative film 13 and the substrate were arranged to be in contact with each other. The obtained decorative film 13 and the molded article 13 were subjected to evaluations as described above. The evaluation results are shown in Table 4.

Ex. 14 to 17

Decorative films 14 to 17 and molded articles 14 to 17 were obtained in the same manner as in Ex. 13 except that the clear coating film forming agent 1 was changed to each of the clear coating film forming agents 4, 7, 8 and 12, as shown in Table 4, and were subjected to the evaluations as described above. The evaluation results are shown in Table 4.

TABLE 4

|  | Ex. 13 | Ex. 14 | Ex. 15 | Ex. 16 | Ex. 17 |
|---|---|---|---|---|---|
| No. of decorative film and molded article | 13 | 14 | 15 | 16 | 17 |
| No. of clear film forming agent | 1 | 4 | 7 | 8 | 12 |
| Moldability of decorative film | S | S | S | S | B |
| Tensile strength of decorative film in molded article | A | A | A | A | C |
| Hydrochloric acid resistance of decorative film | S | S | S | S | A |

As shown in Table 3 and Table 4, the clear layers formed by using the fluorinated polymers 1 to 6 can be suitably used as the clear layers of decorative films.

REFERENCE SYMBOLS

1, 100: decorative film
12, 120: bonding layer
14, 140: clear layer
16, 160: substrate film layer

What is claimed is:

1. A decorative film for decorating a three-dimensionally molded article, comprising at least a substrate film layer and a clear layer, wherein
    the clear layer is made of a fluorinated polymer comprising units based on a fluoroolefin, units based on a monomer having no cross-linkable group, which is at least one member selected from the group consisting of a vinyl ether, a vinyl ester, an allyl ether, an allyl ester and a (meth)acrylic acid ester, and units having a crosslinkable group,
    a content of said units based on a fluoroolefin is from 20 to 70 mol % based on all units contained in said fluorinated polymer, and
    the fluorinated polymer has a number average molecular weight of from 7,000 to 30,000 and a glass transition temperature of from 30 to 120° C.

2. The decorative film according to claim 1, wherein a content of said units having a crosslinkable group is from 3 to 40 mol % based on all units contained in said fluorinated polymer.

3. The decorative film according to claim 1, wherein said units based on a monomer having no crosslinkable group have a $C_{4-8}$ alkyl group represented by formula $—C(Y^{10})_3$ or a $C_{6-10}$ cycloalkyl group, and $Y^{10}$ in the formula —$C(Y^{10})_3$ are each independently a $C_{1-5}$ alkyl group.

4. The decorative film according to claim 1, wherein the fluorinated polymer has a hydroxy value of from 30 to 150 mgKOH/g.

5. The decorative film according to claim 1, wherein the clear layer contains a plasticizer.

6. The decorative film according to claim 5, wherein the plasticizer is a plasticizer made of a (meth)acrylic resin having a weight average molecular weight of from 1,000 to 20,000.

7. The decorative film according to claim 5, wherein the plasticizer is a plasticizer made of a polyether glycol having a weight average molecular weight of from 100 to 10,000.

8. The decorative film according to claim 1, wherein the clear layer contains a compound having two or more isocyanate groups in one molecule.

9. The decorative film according to claim 1, wherein the clear layer contains at least one member selected from the group consisting of an organic ultraviolet absorber and an organic light stabilizer.

10. The decorative film according to claim 1, wherein the three-dimensionally molded article is an automobile exterior member or an automobile interior member.

11. The decorative film according to claim 1, further comprising a bonding layer, wherein the bonding layer, the clear layer and the substrate film layer are sequentially laminated in this order so that the clear layer and the substrate film layer are laminated in contact with each other.

12. The decorative film according to claim 1, further comprising a bonding layer, wherein the bonding layer, the substrate film layer and the clear layer are sequentially laminated in this order.

13. The decorative film according to claim 1, wherein said units based on a monomer having no crosslinkable group have a $C_{4-8}$ alkyl group represented by formula —$C(Y^{10})_3$ and each $Y^{10}$ is independently a $C_{1-5}$ alkyl group.

14. The decorative film according to claim 1, wherein a content of said units based on a monomer having no crosslinkable group is from 5 to 60 mol % based on all units contained in said fluorinated polymer.

15. The decorative film according to claim 1, wherein the crosslinkable group in said units having a crosslinkable group is at least one selected from the group consisting of a hydroxy group, a carboxy group, an amino group, and an alkoxysilyl group.

16. A method for producing a three-dimensionally molded article with a decorative film, the method comprising
press-bonding the bonding layer of the decorative film according to claim 12 and a surface to be decorated of the three-dimensionally molded article in a reduced pressure atmosphere by a vacuum molding method, and then
peeling off the substrate film layer, thereby obtaining the three-dimensionally molded article with the decorative film, which has the clear layer on the outermost surface.

17. A method for producing a three-dimensionally molded article with a decorative film, the method comprising
press-bonding the bonding layer of the decorative film according to claim 12 and a surface to be decorated of the three-dimensionally molded article in a reduced pressure atmosphere by a vacuum molding method, thereby obtaining the three-dimensionally molded article with the decorative film, which has the clear layer on the outermost surface.

* * * * *